UNITED STATES PATENT OFFICE.

CARLETON ELLIS, OF MONTCLAIR, NEW JERSEY.

FLATTING FINISH COMPOSITION AND PROCESS OF MAKING SAME.

1,173,183.  Specification of Letters Patent.  Patented Feb. 29, 1916.

No Drawing.  Application filed December 26, 1914.  Serial No. 879,214.

*To all whom it may concern:*

Be it known that I, CARLETON ELLIS, a citizen of the United States, and a resident of Montclair, in the county of Essex and State of New Jersey, have invented certain new and useful Improvements in Flatting Finish Compositions and Processes of Making Same, of which the following is a specification.

This invention relates to paints and similar varnish compositions and the like, for coating wood and other surfaces and relates in particular to finish compositions capable of drying to a flat or matt surface, all as more fully hereinafter described and set forth in the appended claims.

In order to prepare a paint drying with a flat surface, or matt effect, it has been proposed to make use of Chinese wood oil and a lithopone pigment, thereby taking advantage of the tendency of Chinese wood oil to dry flat and also of the rather coarse structure of lithopone, which aids in giving the requisite surface through the rough character of the pigment particles. According to my observations, if a small amount of kieselguhr is added to a paint, it will cause a flat surface to be produced, but the kieselguhr has a tendency to make such surface somewhat spongy, due doubtless to the very light voluminous character of kieselguhr. Waxes such as paraffin, ceresin and beeswax and the like when added in sufficient quantity to produce a really desirable flat effect, greatly retard the drying, and attempts at the correction of this, by addition of excessive amounts of drier tends to result in a coating of a more perishable character.

The products prepared by treating fatty oils, such as vegetable oil and particularly cottonseed and corn oil and the like with hydrogen in the presence of a catalyzer to cause a very substantial degree of hydrogenation, yield products which when incorporated with drying oils, etc., produce a very desirable flat effect and thin layers of such finish material when exposed to the air dry without any considerable degree of retardation and yield a sufficiently hard coating. To secure the best results with such hardened product, it is well to carry the hydrogenation operation to a point where the melting or titre is approximately 58 to 68° C., or even higher. If allowed to drop to the titre of oleostearin for example, there is a tendency to cause a too greasy character of the product and to retard the drying and to render the paint film undesirably soft.

While lithopone and similar coarse grained pigments enable flat varnishes to be produced, with Chinese wood oil, or possibly even with more or less linseed oil present, the case is the reverse with a very fine pigment such as white lead, made by the Dutch process or in a similar way, which when made into a paint with linseed oil and thinner, dries with a gloss. For a considerable amount of interior work, however, and also for exterior work a flat or gloss-free effect is required and the treatment of a white-lead linseed oil paint to afford a product which when dry exhibits a hard and durable surface with the proper matt or dull finish, which when applied, flows freely under the brush, which is compatible with the pigments employed, which does not give off any undesirable odors to render rooms which are painted with the material highly unpleasant to occupy, which does not show undesirable fluctuations in consistency with the temperature changes and which will remain in a permanently good condition when packaged and placed in storage, has been desired.

By the use of a highly hardened oil, such as thoroughly hardened cottonseed oil, the desired flat effect may be secured with a maximum of benefit and minimum of the disadvantages inferred from the foregoing. Only a small amount of the hardened oil is required to produce a flatting action and a formula which will illustrate the use of this material is the following:—

| | |
|---|---|
| Boiled linseed oil | 10 liters. |
| White lead paste | 25–30 kilos. |
| Heavy benzin | 15 liters. |
| Hardened oil | 1 kilo. |

The hardened oil is melted and reduced with the thinner or the linseed oil, and the composition prepared by incorporating the several ingredients. The white lead paste referred to is ordinary white lead ground in oil to make the form of stiff paste customarily found on the market.

In place of linseed oil, other drying oils may be employed, if desired, including Chinese wood oil and various semi-drying oils, or if desired non-drying oils, or petroleum, or mineral oil may be added in greater or less quantities, according to circumstances, although the latter are ordinarily not to be recommended. Similarly, wax such as ceresin or beeswax and the like may be added, although as indicated these tend to retard drying and are ordinarily not desired in any substantial amount.

Additions of such materials are noted simply for the purpose of making clear that it is possible to use these or other waxes more or less in conjunction with the hardened oil, although as a rule no benefit is derived thereby and in fact more often such additions will be disadvantageous.

The hardened oil remains in a satisfactory state of solution or semi-precipitation in the paint and does not form objectionable crystallized masses, which work lumpy under the brush.

When it is desired to use no other oil but linseed in the paint, a small quantity of the linseed oil may be hardened to as high a titre as possible and used in suitable proportions as for example in the formula herein given. The hardened linseed oil may be used where simply hardened oil is specified.

Another formula employing hardened linseed oil is as follows:—10 liters linseed oil, 25 kilos white lead paste, 15 liters heavy benzin, 3 liters turpentine, 3 liters Japan drier, 1½ kilos grease free hydrogenated oil.

Another formula illustrating the use of a more complex composition is as follows:— Linseed oil 10 liters, white lead paste 20 kilos, barytes 3 kilos, whiting 3 kilos, turpentine 5 liters, heavy benzin 10 liters, cobalt linoleate 1 kilo, ceresin wax ¼ kilo, hydrogenated cottonseed or castor oil of 58 titre 1 kilo, kieselguhr 1 kilo.

Various pigments in addition to white lead may be used including whiting, barytes, china clay, mineral red, lithopone, aluminum oxid and the like.

The foregoing description and illustration are not intended to place any limit on the scope and range of equivalency of the method, formula and components mentioned, or to their proportions. It is however desirable to have a larger proportion of thinner than is employed in ordinary paint. Also it is possible to use petroleum benzin or similar hydrocarbon thinner in place of turpentine as drying takes place readily even if turpentine is not present.

Varnishes and paints containing strongly drying oils and more particularly Chinese wood oil which is now largely used in this industry, exhibit the undesirable property of forming a skin or pellicle in the can or container. If, however at the time the product is packaged for the market, a stream of carbon dioxid gas or other inert gas is passed through the varnish or into the container, so as to expel the air and the can is immediately tightly closed, preferably in an atmosphere of carbon dioxid, the formation of such skin or pellicle is minimized or eliminated. Or if any such formation does occur it is of a very slight or inconsequential nature. In the case particularly of Chinese wood oil preparations, as customarily packaged, such a thick skin or pellicle forms in the course of time that a material portion of the oil is thereby lost or wasted, which loss is avoided in the present case. This method of treatment is applicable to the flatting varnish described herein, as well as to ordinary varnishes and paints and particularly to varnish compositions consisting in the main of Chinese wood oil and rosin with the other usual components, such as thinners, driers, etc.

This application is a continuation of Serial No. 740,416, filed Jan. 6, 1913, in so far as such copending application relates to the preparation of hydrogenated products comprising waxes, or resins or metallic soaps and resinates and is a continuation of Serial No. 808,461, filed Dec. 23, 1913, as relates to the combination or incorporation of hydrogenated oil with solvents such as spirits of turpentine, or heavy benzin, coal tar naphtha and the like and other varnish ingredients, as set forth in said applications.

What I claim is:—

1. The process of making a flat paint comprising essentially linseed oil and white lead, which comprises adding thereto and thoroughly incorporating a modicum of hydrogenated vegetable oil.

2. A paint capable of drying to a flat surface comprising hydrogenated oil.

3. A paint capable of drying to a flat surface comprising hydrogenated vegetable oil.

4. A paint capable of drying to a substantially flat surface, which comprises hydrogenated linseed oil.

5. A paint capable of a substantially dull surface, which comprises white lead, linseed oil and hydrogenated oil.

6. A paint capable of drying to a substantially dull surface which comprises white lead, linseed oil, a thinner, a drier and a modicum of hard hydrogenated oil.

7. A paint capable of drying to a substantially dull surface, which comprises linseed oil, white lead, a thinner and a small quantity of very hard hydrogenated vegetable oil.

8. A paint comprising a hydrogenated vegetable oil.

9. A paint comprising a pigment, a drying oil and a hard hydrogenated glycerid.

Signed at Montclair in the county of Essex and State of New Jersey this 24th day of December A. D. 1914.

CARLETON ELLIS.

Witnesses:
 ENID CURTIS,
 CHARLES E. VAUGHN.